UNITED STATES PATENT OFFICE.

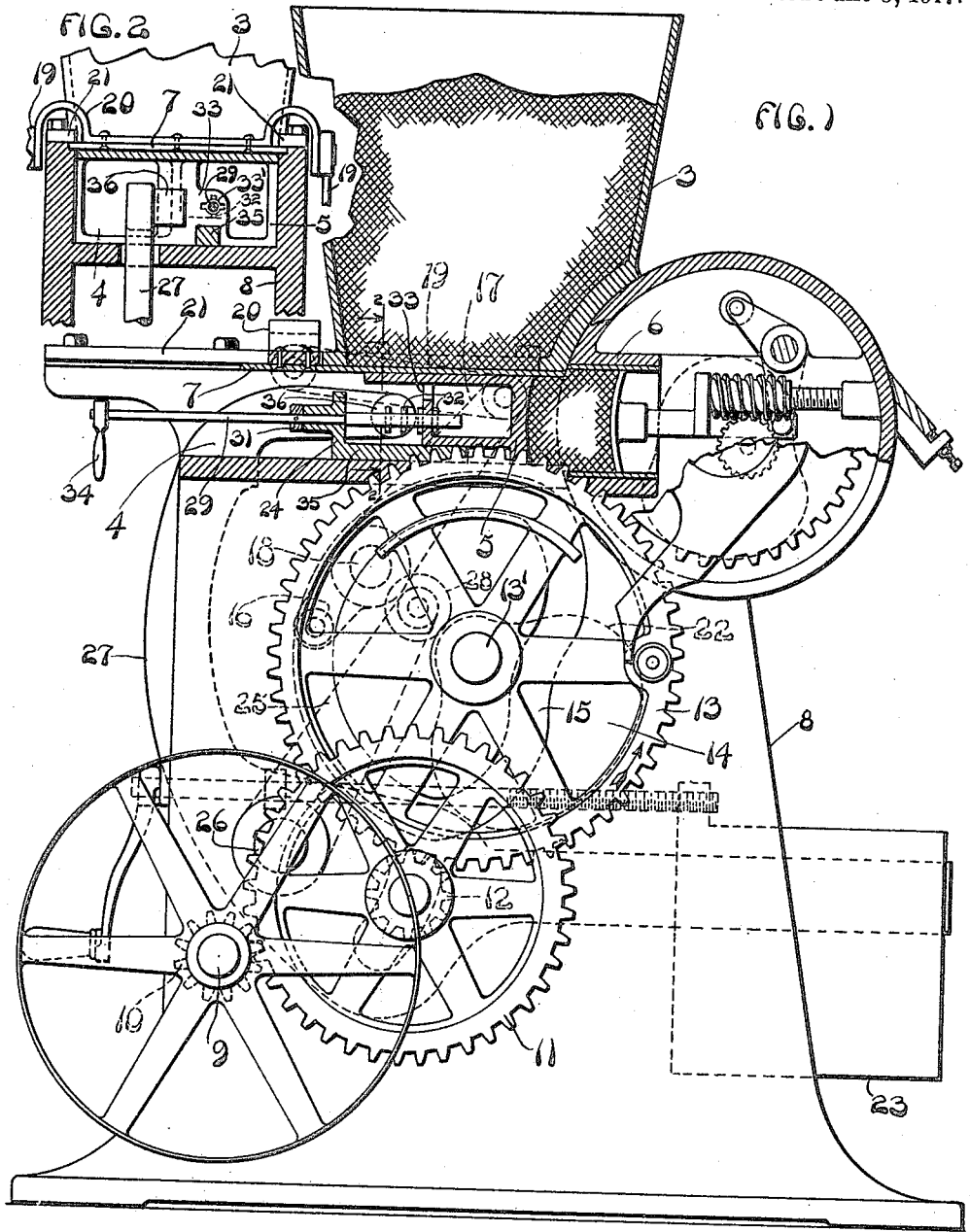

PAUL S. WARD, OF CINCINNATI, OHIO.

DOUGH-DIVIDING MACHINE.

1,229,188.

Specification of Letters Patent.

Patented June 5, 1917.

Application filed June 26, 1912. Serial No. 705,907.

*To all whom it may concern:*

Be it known that I, PAUL S. WARD, a citizen of the United States of America, and resident of Cincinnati, county of Hamilton, and State of Ohio, have invented certain new and useful Improvements in Dough-Dividing Machines, of which the following is a specification.

This invention relates to machines of the character disclosed in my prior Patent No. 842,596; that is, to machines for dividing masses of plastic material, such as dough, into separate portions of uniform size and weight.

An object of my present invention is to produce improved means for separating portions of dough or other plastic material, from the mass to be divided, and for forcing the segregated portions into the measuring receptacles.

This and other objects I attain by means of the machine illustrated in the drawings accompanying and forming a part of this application.

In the drawings Figure 1 is a side elevation of a machine embodying my invention, portions being shown in section for convenience of illustration.

Fig. 2 is a fragmental sectional elevation along the line 2—2 of Fig. 1.

The machine illustrated as an embodiment of my invention includes a hopper 3, which receives dough from a mixing machine, or after it is ready to be divided up into loaf-forming portions. The hopper 3 communicates with a plunger chamber 4, which incloses a reciprocable plunger 5 and which also communicates with a measuring receptacle 6. The communication between the chamber 4 and the hopper 3 is controlled by a reciprocable plate 7, which operates to establish communication between the chamber and the hopper as the plunger 5 moves back, or away from the measuring receptacle, and then closes communication between the chamber and the hopper as the plunger is moved forward or toward the measuring receptacle.

The principal feature of my present invention is the means employed for operating and adjusting the plunger so that the dough received into the chamber during the backward stroke of the plunger, will be subjected to a minimum amount of pounding, by the plunger, during the operation of introducing it into the measuring receptacles. In all machines known to me each piece of dough separated from the mass contained in the hopper and delivered to the plunger chamber may be, and usually is, subjected to several blows from the plunger during the operation of forcing it into the measuring receptacle. This is occasioned by the fact that more dough is received in the plunger chamber during the backward stroke of the plunger than the measuring receptacle is capable of receiving, and consequently the portion remaining in the plunger chamber is subjected again and again to the pounding action of the plunger. This pounding of the plunger is detrimental, since it affects, and to some extent destroys the porosity of the dough and consequently detrimentally affects the texture and the porosity of the bread made from the dough. In operating such machines it is desirable to deliver a little more dough to the plunger chamber than can be forced into the measuring receptacle and I have provided means for adjusting the plunger operating mechanisms so that the plunger will draw a minimum amount of dough into the plunger chamber during each backward stroke and will therefore subject the dough to a minimum amount of pounding during the operation of forcing it into the receptacle. This is accomplished in the illustrated embodiment of my invention by providing a lost motion connection between the plunger and its operating mechanisms, so that the stroke of the plunger may be varied for the purpose of varying the amount of dough delivered to the chamber during the backward stroke of the plunger. With this arrangement the amount of dough delivered to the plunger can be so proportioned that a minimum amount will be left in the chamber at the end of each forward stroke of the plunger. When it is understood that the measuring receptacles are usually so constructed that their size can be varied to compensate for variations in the density of the dough, and also for the purpose of making loaves of different weight, the importance of my invention will be more readily appreciated. No two batches of dough are exactly alike in all particulars and consequently the size of the measuring receptacle must be varied for each batch, in order to provide loaves of bread of uniform weight. As has been pointed out the pounding action of the plunger varies the porosity of the bread and consequently to produce bread of uniform quality it is necessary to adjust the plunger to compensate for variations in the size of the measuring receptacle, so that each portion of dough received into the plunger chamber will be subjected to a minimum amount of pounding.

Referring more particularly to the details of construction:

The machine illustrated includes a frame 8, upon which a driving shaft 9 is journaled. The shaft 9 may be provided with a movable and fixed pulley or any other means for transmitting power to the machine. A pinion 10 is rigidly mounted on the shaft and meshes with a gear 11, which is mounted on a sub-shaft suitably journaled on the frame 8. A pinion 12 is rigidly mounted on the shaft of the gear 11 and meshes with a cam operating gear 13, which is mounted on a shaft 13′, extending transversely of the frame portion and journaled thereon. The gear 13 carries a cam 14, into the cam groove 15 of which, a pin 16 projects. The pin 16 is mounted on the end of a lever 17 which is fulcrumed on a shaft 18, journaled on the frame. The other end of the lever 17 is pivotally connected to a link 19 and the link is operatively connected to the plate 7, by means of a yoke 20. The shaft 18 is provided with a second lever, similar to the lever 17 and which is also operatively connected to the yoke 20 by means of a link, similar to the link 19.

The plate 7 is located on a way formed on the frame portion between the plunger chamber and the hopper and its edges are overhung by means of strips 21, extending along the edges of the way and which operate to hold the plate in place. This construction necessitates the use of the yoke 20 which extends transversely across the plate and is secured to it. By employing the two levers on the shaft 18, and the yoke 20, the plate is subjected to a straight pull, and consequently moves easily along its ways.

A cam 22 is mounted on the shaft 13′ and is employed for the purpose of moving the plunger back or away from the measuring receptacle. The cam 22 operates through the agency of a lever 25 which is rigidly mounted on a shaft 26, and a lever 27 which is also rigidly mounted on the shaft 26. The lever 25 is provided with a roller 28 which bears against the surface of the cam 22 and imparts motion to the lever 25, and consequently the lever 27, as the cam rotates. A weight 23 is adjustably mounted on the lever 27 and is so arranged that it operates to move the plunger forward after it has been moved back by the cam 22, the construction being such that the cam is absolutely incapable of moving the plunger forward.

The groove 15 of the cam 14 is preferably so formed that it moves the plate 7 back with the plunger 5, and consequently permits the plunger 8 to draw dough from the hopper into the plunger chamber during its backward stroke. After the plate and the plunger have reached their rearmost position the plate is moved forward by the cam 14 and thereby cuts off communication between the hopper and the chamber and severs the dough in the chamber from that in the hopper. The weight 23 acts more slowly than the cam 14, but causes the plunger to move forward and forces the mass of dough, located in the chamber, into the measuring receptacle 6. The amount of dough admitted into the chamber during each filling stroke of the plunger should be such, that the plunger will reach the end of its forward stroke and will have completed the operation of filling the receptacle 6 with dough, prior to the time that the roller 28 is again engaged by the surface of the cam 22. The fact that the chamber is receiving too much dough and that the plunger is consequently subjecting the dough to too much pounding, is disclosed by the roller 28, which, under such conditions, moves downwardly to meet the cam 22 instead of standing still at the instant prior to being engaged by the cam. If the roller does move, as described, the amount of dough delivered into the plunger chamber may, and should, be decreased. This is accomplished by varying the amount of lost motion between the plunger and its operating lever 27.

The plunger 5, as illustrated, is formed in two parts, the plunger proper, or the forward part, and the abutment 24, or rear part, which is movable relatively to the forward part. The abutment is adapted to be secured in different positions, relatively to the plunger, by means of a key or lock bar 29. The lock bar extends through the abutment 24 and is rotatively mounted thereon, but is prevented from moving longitudinally thereof by a shoulder, which engages one side of the abutment, and a collar 31, which engages the other side of the abutment and is rigidly secured to the rod in any suitable manner, such for example as by means of a cotter pin. The forwardly projecting end of the rod is provided with tangs or teeth 32 which are shown spaced equal distances apart, extending parallel to each other, and projecting on diametrically opposite sides of the rod. The forward part of the plunger 5 is provided with a diaphragm 33 in which an aperture 33′ is formed. The key rod is adapted to project through the aperture and the aperture is provided with diametrically extending slots, so formed in its edges, that they permit the passage of the teeth 32 when the rod 29 is turned so that the teeth are in alinement with the slots. The rod, however, is provided with a handle 34, located at its rear end, and which is so weighted that it normally turns the rod and holds it so that the teeth 32 extend at right angles to the direction of the slots in the edge of the aperture 33'. The diaphragm 33 is of substantially the same thickness as the distance between adjacent teeth 32. The operation of securing the two parts of the plunger together, consists in moving the abutment to the desired position, with relation to the forward portion of the plunger, so that its forwardly projecting flange 35 projects below and forms a support for the forward portion of the plunger, and then in inserting the key rod 29 through the aperture 33', and in moving it to such a position that one of the teeth 33 is located on each side of the diaphragm. The diaphragm is then turned so that the teeth extend at an angle to the slots in the edge of the aperture 33' and this locks the abutment or rear portion to the front portion of the plunger. When the plunger is in place in the machine a trunnion 36, which is formed at the upper end of the lever 27 projects between the diaphragm 33 and the abutment 24, and by engaging the diaphragm 33, moves the plunger forward, and then moves the plunger back by engaging the abutment. With this construction, the amount of motion of the plunger can be varied by varying the distance between the abutment 24 and the diaphragm 33, or, in other words, by varying the amount of lost motion between the lever 27 and the plunger. The operation of varying the position of the abutment portion with relation to the forward portion of the plunger is similar to that of securing the abutment to the plunger and consists merely in turning the key rod so that its teeth 32 project in the same direction as the slots formed in the edges of the aperture 33' and then in shifting the position of the abutment and thereby sliding the rod through the aperture until the desired position of the abutment is obtained and the desired teeth 32 engage opposite sides of the diaphragm. This operates to vary the stroke of the plunger 5, since the greater the amount of lost motion between the lever 27, or the trunnion 36, and the plunger, the shorter the plunger stroke; and, vice versa, the smaller the amount of lost motion the longer the stroke of the plunger. It is, however, to be noted that no matter how much the stroke of the plunger is varied, the forward limit of the plunger remains the same; that is, the weight 23 operates to return the plunger to the same position, with relation to the measuring receptacle, at the end of each forward stroke.

The measuring receptacle 6, illustrated, is similar in some respects to the receptacle illustrated in my prior patent, above referred to, and, since it forms no part of the present invention, need not be described.

The operation of the apparatus illustrated, is somewhat as follows:

As the wheel 13 turns in the direction of the arrow the cams 14 and 22 operate to simultaneously move the levers 17 and 27. The plate 7 responds immediately to the motion of the lever 17 and starts to move back so as to establish communication between the hopper and the plunger chamber. The lever 27, however, does not start to move the plunger back until its trunnion 36 contacts with the abutment 24. As the plunger moves back it produces a suction in the plunger chamber, which aids the delivery of dough from the hopper to the chamber. After the plunger has reached the rear end of its stroke the plate 7 is moved forward by the cam 14 and cuts off communication between the hopper and the chamber and also severs the mass of dough located in the chamber from the mass located in the hopper. The cam 22 moves from under the roller 28, after the plunger has reached the rear end of the stroke, and permits the weight 23 to move the plunger forward. By employing the weight, I am able to subject the dough in the plunger chamber to substantially uniform pressure throughout the entire forward motion of the plunger. After the plunger has reached its extreme forward position, the measuring receptacle turns and cuts off the mass of dough located within it from the dough remaining in the plunger chamber, and then delivers the measured dough in the usual manner.

The plunger and plate are so constructed that they can be readily removed from the machine for the purpose of cleaning. The plate is removed by merely disengaging the links 19 from the yoke 20 and then sliding it back along the way until it is disengaged from the machine. The plunger is removed by turning the key 29 so that the teeth 32 stand in alinement with the slots in the edge of the aperture 33, and withdrawing the rear or abutment portion of the plunger backwardly out of the plunger chamber. The forward portion of the plunger can then be removed upwardly through the hopper without in any way interfering with the lever 27 or the trunnion 36.

In accordance with the United States patent statutes I have illustrated and described the preferred form of my invention, but I desire it to be understood that various changes, modifications and substitutions may be made in the machine illustrated, without departing from the spirit and scope of my invention as set forth by the appended claims.

What I claim is:

1. In a machine of the character described, a plunger formed in separate parts, adjustable means for locking the parts together and operating means for the plunger projecting between the separate parts after they are locked together.

2. In a machine of the character described, an operating lever, a plunger formed in two separate parts, and means comprising a lock bar for locking the parts together in different relative positions, the lever being adapted to engage the plunger between said separate parts to operatively connect the plunger and the lever.

3. In a machine of the character described, a reciprocating plunger formed in two parts, positively actuated means for reciprocating the plunger, and means for locking the parts of the plunger together in different relative positions and for thereby varying the throw of the plunger without varying the forward limit of its motion.

PAUL S. WARD.

Witnesses:
RALPH H. INOTT,
E. W. McCALLISTER.

Copies of this patent may be obtained for five cents each, by addressing the "Commissioner of Patents, Washington, D. C."